United States Patent
Tsai et al.

(10) Patent No.: US 11,902,510 B2
(45) Date of Patent: Feb. 13, 2024

(54) VIDEO PROCESSING METHODS AND APPARATUSES FOR DETERMINING DEBLOCKING FILTER DECISION IN VIDEO CODING SYSTEMS

(71) Applicant: MEDIATEK INC., Hsinchu (TW)

(72) Inventors: Chia-Ming Tsai, Hsinchu (TW); Chih-Wei Hsu, Hsinchu (TW)

(73) Assignee: HFI INNOVATION INC., Hsinchu County (TW)

( * ) Notice: Subject to any disclaimer, the term of this patent is extended or adjusted under 35 U.S.C. 154(b) by 240 days.

(21) Appl. No.: 17/614,712

(22) PCT Filed: May 28, 2020

(86) PCT No.: PCT/CN2020/092978
§ 371 (c)(1),
(2) Date: Nov. 29, 2021

(87) PCT Pub. No.: WO2020/239038
PCT Pub. Date: Dec. 3, 2020

(65) Prior Publication Data
US 2022/0224886 A1 Jul. 14, 2022

Related U.S. Application Data

(60) Provisional application No. 62/915,053, filed on Oct. 15, 2019, provisional application No. 62/854,382, filed on May 30, 2019.

(51) Int. Cl.
*H04N 19/105* (2014.01)
*H04N 19/186* (2014.01)
(Continued)

(52) U.S. Cl.
CPC ......... *H04N 19/105* (2014.11); *H04N 19/176* (2014.11); *H04N 19/186* (2014.11); *H04N 19/80* (2014.11)

(58) Field of Classification Search
CPC ..... H04N 19/105; H04N 19/186; H04N 19/80
(Continued)

(56) References Cited

U.S. PATENT DOCUMENTS

| 10,425,647 B2 | 9/2019 | Lai et al. |
| 10,904,543 B2 | 1/2021 | Hannuksela |

(Continued)

FOREIGN PATENT DOCUMENTS

| CN | 105556963 A | 5/2016 |
| TW | 201517597 A | 5/2015 |
| TW | 201709738 A | 3/2017 |

OTHER PUBLICATIONS

Abdoli,M.,etal.; "AHG11:BlockDPCMforScreenContentCoding;"JointVideoExpertsTeam(JVET)ofITU-TSG 6WP3andISO/IECJTC1/SC29/WG11;Oct. 2018;pp. 1-7 (Year: 2018).*

(Continued)

*Primary Examiner* — Jeffery A Williams
(74) *Attorney, Agent, or Firm* — McClure, Qualey & Rodack, LLP

(57) ABSTRACT

Video processing methods and apparatuses for coding a current block and a adjacent block comprise receiving input data of the current and adjacent blocks in a current picture, determines the current and adjacent blocks are both coded in a BDPCM or RDPCM mode, performing a deblocking filtering operation on an edge between the current and adjacent blocks by de-activating deblocking filtering for a first color component and activating deblocking filtering for a second color component, and encoding or decoding the current and adjacent blocks. Each current pixel in a BDPCM coded block is predicted by one or more neighboring pixels of the current pixel. RDPCM is applied to process quantized residues of a RDPCM coded block according to a prediction direction of the RDPCM coded block.

15 Claims, 5 Drawing Sheets

(51) Int. Cl.
   *H04N 19/80*       (2014.01)
   *H04N 19/176*      (2014.01)
(58) Field of Classification Search
   USPC ..................................................... 375/240.02
   See application file for complete search history.

(56) References Cited

U.S. PATENT DOCUMENTS

| | | |
|---|---|---|
| 11,006,130 B2 | 5/2021 | Xiu et al. |
| 2015/0382003 A1 | 12/2015 | Gamei et al. |

OTHER PUBLICATIONS

International Search Report dated Aug. 27, 2020, issued in application No. PCT/CN2020/092978.
Jang, H., et al.; "Non-CE5 : Deblock filtering process for BDPCM block;" Joint Video Experts Team (JVET) of ITU-T SG 16 WP 3 and ISO/IEC JTC 1/SC 29/WG 11; Jul. 2019; pp. 1-9.
Abdoli, M., et al.; "AHG11: Block DPCM for Screen Content Coding;" Joint Video Experts Team (JVET) of ITU-T SG 16 WP 3 and ISO/IEC JTC 1/SC 29/WG 11; Oct. 2018; pp. 1-7.
Karczewicz, M., et al.; "CE8-related: Quantized residual BDPCM;" Joint Video Experts Team (JVET) of ITU-T SG 16 WP 3 and ISO/IEC JTC 1/SC 29/WG 11; Mar. 2019; pp. 1-5.
Chinese language office action dated Oct. 12, 2021, issued in application No. TW 109118032.

* cited by examiner

VIDEO PROCESSING METHODS AND APPARATUSES FOR DETERMINING DEBLOCKING FILTER DECISION IN VIDEO CODING SYSTEMS

CROSS REFERENCE TO RELATED APPLICATION

The present invention claims priority to U.S. Provisional Patent Application Ser. No. 62/854,382, filed on May 30, 2019, entitled "Deblocking Filter Decisions for Block DPCM and Quantized Residual BDPCM", and U.S. Provisional Patent Application Ser. No. 62/915,053, filed on Oct. 15, 2019, entitled "Deblocking Filter Decisions for Block DPCM and Transform skip Mode". The U.S. Provisional Patent Applications are hereby incorporated by reference in their entireties.

FIELD OF THE INVENTION

The present invention relates to video processing methods and apparatuses in video encoding and decoding systems. In particular, the present invention relates to deblocking filter decisions for an edge between two Block Differential Pulse Code Modulation (BDPCM) coded blocks or between two Residual Differential Pulse Code Modulation (RDPCM) coded blocks.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard improves the video compression performance of its proceeding standard H.264/AVC to meet the demand for higher picture resolutions, higher frame rates, and better video qualities. The HEVC standard relies on a block-based coding structure which divides each video slice into multiple square Coding Tree Units (CTUs), where a CTU is the basic unit for video compression in HEVC. A raster scan order is used to encode or decode CTUs in each slice. Each CTU may contain one Coding Unit (CU) or recursively split into four smaller CUs according to a quad-tree partitioning structure until a predefined minimum CU size is reached. The prediction decision is made at the CU level, where each CU is coded using either inter picture prediction or intra picture prediction. Once the splitting of CU hierarchical tree is done, each CU is subject to further split into one or more Prediction Units (PUs) according to a PU partition type for prediction. The PU works as a basic representative block for sharing prediction information as the same prediction process is applied to all pixels in the PU. The prediction information is conveyed to the decoder on a PU basis. Motion estimation identifies one (uni-prediction) or two (bi-prediction) best reference blocks for a CU coded using inter picture prediction in one or two reference pictures, and motion compensation in inter picture prediction locates the one or two best reference blocks according to one or two Motion Vectors (MVs). A CU coded using intra picture prediction is predicted by reference samples in the same picture. Prediction errors of a CU are differences between the CU and the predictor, and the prediction errors are split into one or more Transform Units (TUs) for transform and quantization.

Block Differential Pulse Code Modulation (BDPCM) In the upcoming emerging video coding standard, Block Differential Pulse Code Modulation (Block-DPCM or BDPCM) has been developed to predict pixels in a luminance (luma) component of an intra CU having each dimension smaller than or equal to 32 samples. A BDPCM flag bdpcm_flag is transmitted at the CU level for each intra CU with a width and height smaller than or equal to 32 luma samples. The BDPCM flag for an intra CU indicates whether regular intra coding or Block-DPCM is applied to the intra CU, and the BDPCM flag is encoded using a single CABAC context. When BDPCM is selected to encode or decode a current block, each sample in the current block is predicted from neighboring samples in vertical and horizontal directions using the Median Edge Detector of LOCO-I. For a current pixel X in the current block having pixel A as the left neighbor, pixel B as the top neighbor, and C as the top-left neighbor, the predictor for the current pixel $P(X)$ is derived by:

$$P(X) = \min(A, B) \text{ if } C \geq \max(A, B);$$
$$\max(A, B) \text{ if } C \leq \min(A, B);$$
$$A + B - C \text{ otherwise.}$$

The top row of a current block is predicted using unfiltered reference pixels when the top and top-left neighbors are selected, and the left column of the current block is predicted using unfiltered reference pixels when the left and top-left neighbors are selected. The top row except for the first pixel is predicted using reconstructed pixels when the left neighbors are selected, and the left column except for the first pixel is predicted using reconstructed pixels when the top neighbors are selected. The remaining rows and columns of the current block are also predicted using reconstructed pixels. Pixels are processed in a raster scan order inside the current block. The differences between the predictor of the current block and the original data of the current block is called prediction errors, also referred to as residues of the current block, and the prediction errors of the current block are quantized in a spatial domain after rescaling, in a way identical to the quantization in Transform Skip Mode (TSM). Each pixel is then reconstructed by adding the quantized prediction errors to the predictor. The reconstructed pixels are used to predict subsequent pixels in a raster scan order. Amplitudes and signs of the quantized prediction errors are encoded separately. A cbf_bdpcm_flag is first coded, and if this flag is equal to zero, all amplitudes of the current block are to be decoded as zero. If this flag is equal to 1, all amplitudes of the current block are encoded individually in a raster scan order. In order to keep low complexity of BDPCM, the value of amplitudes is limited to at most 31 inclusive. The amplitudes are encoded using unary binarization, with three contexts for the first bin, then one context for each additional bin until the twelfth bin, and one context for all remaining bins. A sign is encoded in bypass mode for each non-zero residue.

In order to maintain the coherence of the regular intra prediction mode, the first mode in the Most Probable Mode (MPM) list is associated with a BDPCM predicted CU (without being transmitted) and is available for MPM generation for subsequent blocks.

The deblocking filters for both luminance (luma) and chrominance (chroma) components are de-activated on a border between two BDPCM blocks, since neither of the two BDPCM blocks is processed by a transform stage, where the transform stage is usually responsible for blocking artifacts.

Residual Differential Pulse Code Modulation (RDPCM) An alternative scheme to BDPCM is quantized Residual domain BDPCM (RDPCM), which was further renamed to BDPCM in VVC). A signaled BDPCM direction indicates whether vertical or horizontal prediction is employed. The reference pixels used in BDPCM are unfiltered samples and reconstructed samples, and the prediction errors are quantized in the spatial domain. The reference pixels are used to predict rows or columns of a BDPCM coded block line by line. Pixels are reconstructed by adding the de-quantized prediction errors to the predictor. The signaling and prediction directions used in RDPCM are identical to the BDPCM scheme. In RDPCM, prediction is done on the entire block by sample copying in the horizontal or vertical prediction direction similar to intra prediction. The residues are quantized and the differences between the quantized residues and the predictor (horizontal or vertical) are coded. For a block of size M rows and N columns, let $r_{i,j}$, $0 \leq i \leq M-1$, $0 \leq j \leq N-1$ be the prediction residues after performing intra prediction horizontally or vertically using unfiltered samples from above or left block boundary samples. Left neighbor pixel values across a current block are copied to each column in the predictor for the current block if the RDPCM is performed in the horizontal direction, and a top neighbor line is copied to each line in the predictor for the current block if RDPCM is performed in the vertical direction.

Let $Q(r_{i,j})$, $0 \leq i \leq M-1$, $0 \leq j \leq N-1$ denotes the quantized version of the residues $r_{i,j}$, where the residues are differences between original block and the predicted block values. Then RDPCM is applied to the quantized residual samples, resulting in modified M×N array $\tilde{R}$ with elements $\tilde{r}_{i,j}$. When the vertical direction is signaled:

$$\tilde{r}_{i,j} = \begin{cases} Q(r_{i,j}), & i = 0, \, 0 \leq j \leq (N-1) \\ Q(r_{i,j}) - Q(r_{(i-1),j}), & 1 \leq i \leq (M-1), \, 0 \leq j \leq (N-1) \end{cases}.$$

For the horizontal prediction, similar rules apply, and the residual quantized samples are obtained by $$\tilde{r}_{i,j} = \begin{cases} Q(r_{i,j}), & 0 \leq i \leq (M-1), \, j = 0 \\ Q(r_{i,j}) - Q(r_{(i-1),j}), & 0 \leq i \leq (M-1), \, 1 \leq j \leq (N-1) \end{cases}.$$

The residual quantized samples $\tilde{r}_{i,j}$ are sent to the decoder. On the decoder side, the above calculations are reversed to generate the quantized residues $Q(r_{i,j})$, $0 \leq i \leq M-1$, $0 \leq j \leq N-1$. For the vertical prediction case.

$$Q(r_{i,j}) = \sum_{k=0}^{i} \tilde{r}_{k,j}, 0 \leq i \leq (M-1), 0 \leq j \leq (N-1).$$

For the horizontal prediction case, $$Q(r_{i,j}) = \sum_{k=0}^{j} \tilde{r}_{i,k}, 0 \leq i \leq (M-1), 0 \leq j \leq (N-1).$$

The inverse quantized residues, $Q^{-1}(Q(r_{i,j}))$, are added to the prediction values to produce the reconstructed sample values.

The main benefit of the RDPCM scheme is that inverse RDPCM can be done on the fly during coefficient parsing by simply adding the predictor with the parsed coefficients or inverse RDPCM can be performed after coefficient parsing. The splitting of 4×N and N×4 blocks into 2 parallel processed blocks can be eliminated.

Deblocking Filter A deblocking filter tool was developed to alleviate the blocking artifacts along boundaries of blocks in block based video coding systems. The deblocking filter tool is an in-loop filter applied to a decoded picture, as filtered pictures are stored back into a decoded picture buffer and used to predict other pictures in a sequence of video pictures. A deblocking filtering operation is a combination of deblocking filtering decisions and filtering processing. The deblocking filtering decisions determine whether deblocking filtering is applied and the strength of filtering. The filtering processing modifies the values of the pixels at the block boundaries chosen by the deblocking filtering decisions. The deblocking filtering operations are independent across luma and chroma components, thus making it possible to process all three components independently. The deblocking filtering decisions include on/off decision, normal/strong filter decision, and a number of pixels being modified by the deblocking filter in the normal filter mode. The deblocking filtering decisions are made depending on the bitstream information such as prediction modes and motion vectors as some coding conditions are more likely to create strong block artifacts. A Boundary strength (bS) value is defined according to the deblocking filtering decisions and the filtering processing is only applied to block boundaries with bS greater than zero. A strong deblocking filter implemented by a bilinear filter is applied to luma boundary samples when all three conditions are true. Condition 1 is a "large block condition", which detects whether luma samples at either p-side or q-side of a boundary belong to a large block. A larger block is defined as when a width is larger than or equal to 32 luma samples for a vertical edge, or when a height is larger than or equal to 32 luma samples for a horizontal edge. Conditions 2 and 3 are determined by the following formulas, where β is a threshold having piece-wise linear dependency on the Quantization Parameter (QP) and tC is a clipping offset also depending on the QP.

Condition2=(d<β)?TRUE: FALSE

Condition3=Strong Filter Condition=(dpq is less than (β>>2), sp3+sq3 is less than (3*β>>5), and Abs(p0−q0) is less than (5*tC+1)>>1)?TRUE:FALSE In cases when the strong deblocking filter is selected for a block boundary, block boundary samples at the p-side pi for i=0 to Sp−1 and block boundary samples at the q-side qj for j=0 to Sq−1 are replaced by linear interpolation as follows:

$$p'_i = (f_i * Middle_{s,t} + (64 - f_i) * P_s + 32) \gg 6), \text{ clipped to } p_i \pm tcPD_i$$

$$q'_j = (g_j * Middle_{s,t} + (64 - g_j) * Q_s + 32) \gg 6), \text{ clipped to } q_j \pm tcPD_j$$

where $tcPD_i$ and $tcPD_j$ are position dependent clipping variables and strong deblocking parameters $g_j$, $f_i$, $Middle_{s,t}$, $P_s$ and $Q_s$ are derived by equations as shown in Table 1.

TABLE 1

Derivation of strong deblocking parameters for luma component

| Sp, Sq | |
|---|---|
| 7, 7 (p side: 7, q side: 7) | $f_i = 59 - i * 9$, can also be described as $f = \{59, 50, 41, 32, 23, 14, 5\}$<br>$g_j = 59 - j * 9$, can also be described as $g = \{59, 50, 41, 32, 23, 14, 5\}$<br>$\text{Middle}_{7,7} = (2 * (p_o + q_o) + p_1 + q_1 + p_2 + q_2 + p_3 + q_3 + p_4 + q_4 + p_5 + q_5 + p_6 + q_6 + 8) >> 4$<br>$P_7 = (p_6 + p_7 + 1) >> 1, Q_7 = (q_6 + q_7 + 1) >> 1$ |
| 7, 3 (p side: 7 q side: 3) | $f_i = 59 - i * 9$, can also be described as $f = \{59, 50, 41, 32, 23, 14, 5\}$<br>$g_j = 53 - j * 21$, can also be described as $g = \{53, 32, 11\}$<br>$\text{Middle}_{7,3} = (2 * (p_o + q_o) + q_0 + 2 * (q_1 + q_2) + p_1 + q_1 + p_2 + p_3 + p_4 + p_5 + p_6 + 8) >> 4$<br>$P_7 = (p_6 + p_7 + 1) >> 1, Q_3 = (q_2 + q_3 + 1) >> 1$ |
| 3, 7 (p side: 3 q side: 7) | $g_j = 59 - j * 9$, can also be described as $g = \{59, 50, 41, 32, 23, 14, 5\}$<br>$f_i = 53 - i * 21$, can also be described as $f = \{53, 32, 11\}$<br>$\text{Middle}_{3,7} = (2 * (q_o + p_o) + p_0 + 2 * (p_1 + p_2) + q_1 + p_1 + q_2 + q_3 + q_4 + q_5 + q_6 + 8) >> 4$<br>$Q_7 = (q_6 + q_7 + 1) >> 1, P_3 = (p_2 + p_3 + 1) >> 1$ |
| 7, 5 (p side: 7 q side: 5) | $g_j = 58 - j * 13$, can also be described as $g = \{58, 45, 32, 19, 6\}$<br>$f_i = 59 - i * 9$, can also be described as $f = \{59, 50, 41, 32, 23, 14, 5\}$<br>$\text{Middle}7, 5 = (2 * (p_o + q_o + p_1 + q_1) + q_2 + p_2 + q_3 + p_3 + q_4 + p_4 + q_5 + p_5 + 8) >> 4$<br>$Q_5 = (q_4 + q_5 + 1) >> 1, P_7 = (p_6 + p_7 + 1) >> 1$ |
| 5, 7 (p side: 5 q side: 7) | $g_j = 59 - j * 9$, can also be described as $g = \{59, 50, 41, 32, 23, 14, 5\}$<br>$f_i = 58 - i * 13$, can also be described as $f = \{58, 45, 32, 19, 6\}$<br>$\text{Middle}5, 7 = (2 * (q_o + p_o + p_1 + q_1) + q_2 + p_2 + q_3 + p_3 + q_4 + p_4 + q_5 + p_5 + 8) >> 4$<br>$Q_7 = (q_6 + q_7 + 1) >> 1, P_5 = (p_4 + p_5 + 1) >> 1$ |
| 5, 5 (p side: 5 q side: 5) | $g_j = 58 - j * 13$, can also be described as $g = \{58, 45, 32, 19, 6\}$<br>$f_i = 58 - i * 13$, can also be described as $f = \{58, 45, 32, 19, 6\}$<br>$\text{Middle}5, 5 = (2 * (q_o + p_o + p_1 + q_1 + q_2 + p_2) + q_3 + p_3 + q_4 + p_4 + 8) >> 4$<br>$Q_5 = (q_4 + q_5 + 1) >> 1, P_5 = (p_4 + p_5 + 1) >> 1$ |
| 5, 3 (p side: 5 q side: 3) | $g_j = 53 - j * 21$, can also be described as $g = \{53, 32, 11\}$<br>$f_i = 58 - i * 13$, can also be described as $f = \{58, 45, 32, 19, 6\}$<br>$\text{Middle}5, 3 = (q_o + p_o + p_1 + q_1 + q_2 + p_2 + q_3 + p_3 + 4) >> 3$<br>$Q_3 = (q_2 + q_3 + 1) >> 1, P_5 = (p_4 + p_5 + 1) >> 1$ |
| 3, 5 (p side: 3 q side: 5) | $g_j = 58 - j * 13$, can also be described as $g = \{58, 45, 32, 19, 6\}$<br>$f_i = 53 - i * 21$, can also be described as $f = \{53, 32, 11\}$<br>$\text{Middle}3, 5 = (q_o + p_o + p_1 + q_1 + q_2 + p_2 + q_3 + p_3 + 4) >> 3$<br>$Q_5 = (q_4 + q_5 + 1) >> 1, P_3 = (p_2 + p_3 + 1) >> 1$ |

The strong deblocking filter for the chroma components also modifies three samples from the block boundary and enables strong low-pass filtering. The strong deblocking filter for the chroma components is defined as:

$$p2' = (3*p3 + 2*p2 + p1 + p0 + q0 + 4) \gg 3$$

$$p1' = (2*p3 + p2 + 2*p1 + p0 + q0 + q1 + 4) \gg 3$$

$$p0' = (p3 + p2 + p1 + 2*p0 + q0 + q1 + q2 + 4) \gg 3$$

The chroma deblocking filter is applied on a 4×4 chroma sample grid, and the chroma deblocking filter is selected when both sides of a chroma edge are greater than or equal to eight chroma samples and when the following three decisions are satisfied. The first decision is associated with the boundary strength decision as well as the large block decision. The second and third decisions are the same as the luma decisions, which are the on/off decision and strong filter decision respectively. In the first decision, bS determination is modified for chroma deblocking filtering as shown in Table 2. The conditions in Table 2 are checked sequentially, and if a condition is satisfied then the remaining conditions with lower priorities are skipped.

TABLE 2

The modified boundary strength determination

| priority | Conditions | Y | U | V |
|---|---|---|---|---|
| 5 | At least one of the adjacent blocks is intra | 2 | 2 | 2 |
| 4 | At least one of the adjacent blocks has non-zero transform coefficients | 1 | 1 | 1 |
| 3 | An absolute difference between the motion vectors that belong to the adjacent blocks is greater than or equal to a threshold (for example, one integer luma sample, 8 in units of 1/16 luma samples or any other threshold) | 1 | N/A | N/A |
| 2 | Motion prediction (for example, the reference pictures or the number or any other kind of motion prediction) of motion vectors used in the adjacent blocks are different | 1 | N/A | N/A |
| 1 | Otherwise | 0 | 0 | 0 |

The chroma deblocking filter is performed when bS is equal to 2, or when bS is equal to 1 when a large block boundary is detected. The second and third decisions are basically the same as the HEVC luma strong filter decisions.

Deblocking Filter for Subblock Boundary In the upcoming emerging video coding standard, a deblocking filtering operation may be applied to CU boundaries as well as subblock boundaries, which are aligned with the 8×8 grids. The subblock boundaries include the Prediction Unit (PU) boundaries introduced by Spatial Temporal Motion Vector Prediction (STMVP) and affine modes, and the Transform Unit (TU) boundaries introduced by Sub-block Transform (SBT) and Intra Sub-Partitions (ISP) modes. For SBT and ISP subblocks on 8×8 grids, the same method as TUs in the conventional deblocking filter is applied. The deblocking filter is applied to TU boundaries on 8×8 grids when there are non-zero transform coefficients in either subblock across the edge. For Subblock Temporal Motion Vector Prediction (SbTMVP) and affine subblocks on 8×8 grids, the same method as PUs in the conventional deblocking filter is applied. For PU boundaries, the deblocking filter is applied on 8×8 grids with the consideration of the difference between motion vectors and reference pictures of the neighboring subblock.

BRIEF SUMMARY OF THE INVENTION

In exemplary embodiments of the video processing method, a video encoding or decoding system receives input video data associated with a current block and an adjacent block in a current picture, determines if the current block and the adjacent block are both coded in a BDPCM mode or are both coded in a RDPCM mode, performs a deblocking filtering operation on an edge between the current block and the adjacent block by de-activating deblocking filtering for a first color component on the edge and activating deblocking filtering for a second color component on the edge when the current block and the adjacent block are both coded in a BDPCM or RDPCM mode, and encodes or decodes the current block and the adjacent block in the current picture. The adjacent block is spatially adjacent to the current block. The deblocking filtering operation on an edge between the current block and the adjacent block is performed based on the determination result. Each current pixel in a BDPCM coded block in the current picture is predicted by one or more neighboring pixels of the current pixel in the current picture. In some embodiments, the one or more neighboring pixels used to predict the current pixel in the BDPCM coded block include one or a combination of a left neighboring pixel of the current pixel, a top neighboring pixel of the current pixel, and a top-left neighboring pixel of the current pixel. A neighboring pixel used to predict the current pixel in the BDPCM coded block is an unfiltered reference pixel when the neighboring pixel is outside of the BDPCM coded block, or a neighboring pixel used to predict the current pixel in the BDPCM coded block is a reconstructed pixel when the neighboring pixel is within the BDPCM coded block. For a RDPCM coded block, RDPCM is applied to quantized residues of the RDPCM coded block according to a prediction direction of the RDPCM coded block to modify the quantized residues.

In an embodiment of only applying the BDPCM or RDPCM mode to a luma component of video data, the first color component is the luma component and the second color component is one or more chroma components. In an embodiment of only applying the BDPCM or RDPCM mode to one or more chroma components of video data, the first color component is the one or more chroma components and the second color component is a luma component.

In an embodiment of the present invention, a boundary strength value of deblocking filtering for the first color component on the edge between the current block and the adjacent block is set to zero and a boundary strength value of deblocking filtering for the second color component on the edge is set to two. That is a deblocking filter might be used to filter the second color component on the edge between the current and adjacent blocks according to this embodiment.

Some embodiments of the video encoding system determine a predictor of each current pixel in the current block coded in the BDPCM mode from one or more neighboring pixels of the current pixel, determine a residue for each current pixel according to the predictor of each current pixel, quantize the residue of each current pixel in a spatial domain, de-quantize the quantized residue of each current pixel, and reconstruct each current pixel by adding the de-quantized residue to the predictor of each current pixel. Each reconstructed current pixel of the current block may be used to predict a subsequent pixel in the current block according to a raster scan order. Some embodiments of the video decoding system determine a predictor of each current pixel in the current block coded in the BDPCM mode from one or more neighboring pixels of the current pixel, decode and de-quantize a quantized residue for each current pixel, and reconstruct each current pixel by adding the de-quantized residue to the predictor of each current pixel. Each reconstructed current pixel of the current block may be used to predict a subsequent pixel in the current block according to a raster scan order.

Some embodiments of the video encoding system determine a predictor of each current pixel in the current block coded in the RDPCM mode, determine a residue for each current pixel according to the predictor of each current pixel, quantize the residue of each current pixel in a spatial domain, apply RDPCM to the quantized residues of the current block, de-quantize the processed quantized residues, and reconstruct each current pixel by adding the corresponding de-quantized residue and the predictor of the current pixel. Some embodiment of the video decoding system further determine a predictor of each current pixel in the current block coded in the RDPCM mode, decode the quantized residues of the current block, apply RDPCM to process the quantized residues, de-quantize the processed quantized residues, and reconstruct each current pixel by adding the corresponding de-quantized residue and the predictor for each current pixel.

In some embodiments of applying RDPCM, the video encoding or decoding system determines a prediction direction of the current block and a prediction direction of the adjacent block, and if the two prediction directions are different, the deblocking filtering operation is performed on the edge between the current and adjacent blocks by activating deblocking filtering for both the first and second color components. If the two prediction directions are the same, the deblocking filtering operation is performed on the edge between the current and adjacent blocks by de-activating deblocking filtering for the first color component and activating deblocking filtering for the second color component. The prediction direction of the current block and the prediction direction of the adjacent block are explicitly signaled in or parsed from a video bitstream according to an embodiment.

An embodiment of the video encoding system explicitly signals a BDPCM prediction mode flag for the current block and the adjacent block, and the video decoding system parses a BDPCM prediction mode flag for the current block and the adjacent block. The current block and the adjacent block may be CUs, PUs, or TUs. In one embodiment of coding the current block in the BDPCM mode, the video processing method further comprises receiving input data associated with a second adjacent block adjacent to the current block, and performing a deblocking filtering operation on an edge between the current block and the second adjacent block. The deblocking filtering operation performed on the edge between the current and second adjacent blocks includes activating deblocking filtering for both the first and second color components if the second adjacent block is coded in a mode other than the BDPCM mode. For example, boundary strength values for both the first and second color components are set to two for deblocking filtering the edge between the current block and the second adjacent block if the second adjacent block is not coded in the BDPCM mode.

Aspects of the disclosure further provide an apparatus for performing video processing in a video coding system. The apparatus comprises one or more electronic circuits configured for receiving input data of a current block and an adjacent block in a current picture, determining if the current block and the adjacent block are both coded in a BDPCM or RDPCM mode, performing a deblocking filtering operation on an edge between the current block and the adjacent block by de-activating deblocking filtering for a first color component and activating deblocking filtering for a second color component when the current block and the adjacent block are both coded in the BDPCM or RDPCM mode, and encoding or decoding the current block and the adjacent block in the current picture.

BRIEF DESCRIPTION OF THE DRAWINGS

Various embodiments of this disclosure that are proposed as examples will be described in detail with reference to the following figures, and wherein.

DETAILED DESCRIPTION OF THE INVENTION

Figure 1:
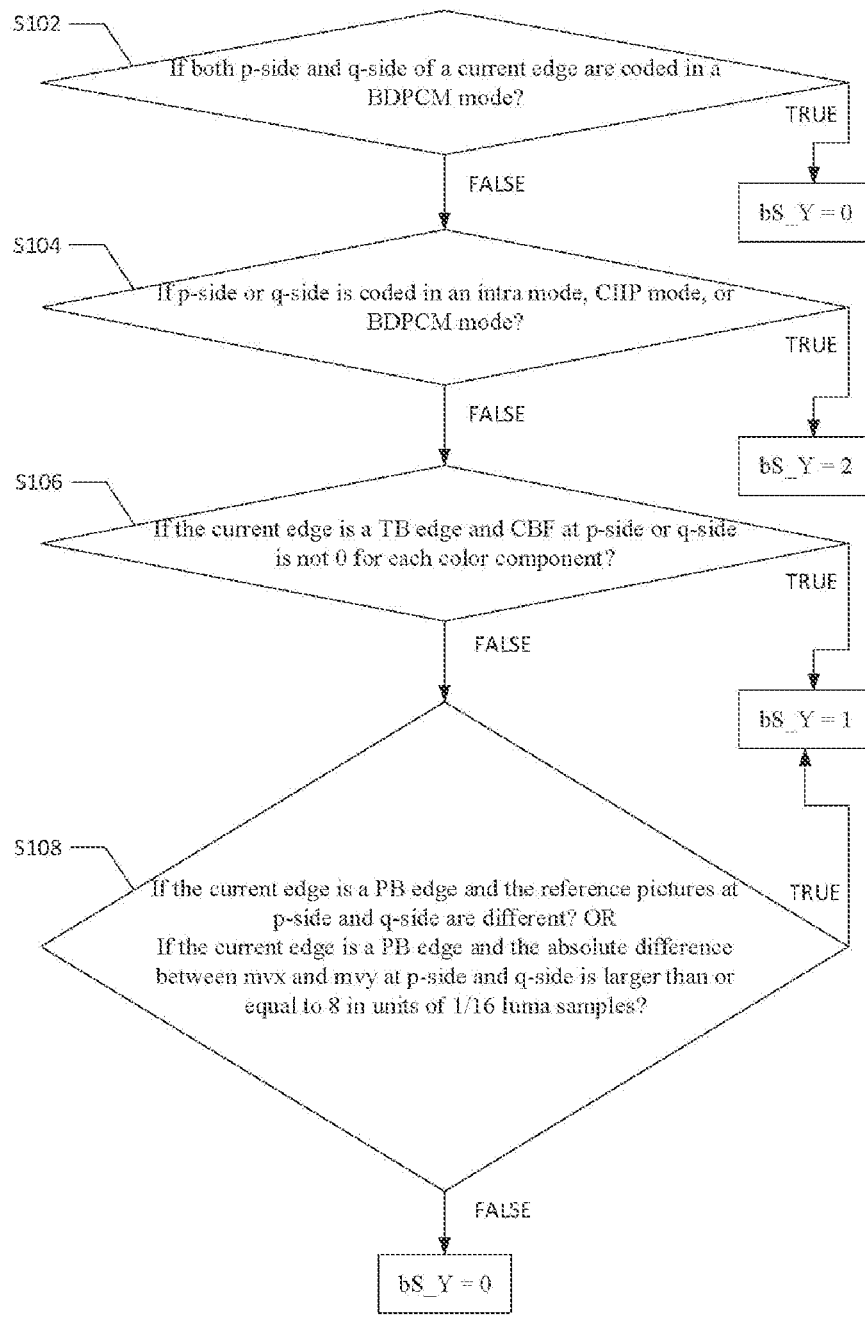
FIG. 1 illustrates determination of a boundary strength value of deblocking filtering for a luma component Y on an edge between p-side and q-side according to an embodiment of the present invention.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Deblocking Filter Decision for an Edge Between Two BDPCM or RDPCM Blocks In some of the exemplary embodiments of the present invention, the BDPCM or RDPCM mode is only applied to the luma component of video data. For a current block coded in the BDPCM mode, a luma deblocking filter is de-activated on an edge between two BDPCM blocks (i.e., the current block and another BDPCM coded block adjacent to the current block). For a current block coded in the RDPCM mode, a luma deblocking filter is de-activated on an edge between two RDPCM blocks (i.e., the current block and another RDPCM coded block adjacent to the current block). The term BDPCM block or RDPCM block and the term BDPCM coded block or RDPCM coded block are used interchangeably in the present specification representing at least a color component of the block is processed by the BDPCM or RDPCM mode. Each current pixel in a BDPCM coded block is predicted by one or more neighboring pixels of the current pixel in the current picture. For example, the neighboring pixels used to predict the current pixel in the BDPCM coded block include one or a combination of a left neighboring pixel of the current pixel, a top neighboring pixel of the current pixel, and a top-left neighboring pixel of the current pixel. A neighboring pixel used to predict the current pixel in the BDPCM coded block is an unfiltered reference pixel if the neighboring pixel is outside of the BDPCM coded block, and a neighboring pixel used to predict the current pixel in the BDPCM coded block is a reconstructed pixel if the neighboring pixel is within the BDPCM coded block. RDPCM is applied to quantized residues of a RDPCM coded block according to a prediction direction, for example, the prediction direction is chosen from a horizontal direction and vertical prediction. In an embodiment, the prediction direction is explicitly signaled in or parsed from a video bitstream for each RDPCM coded block. The luma deblocking filter is de-activated on an edge between two BDPCM blocks according to an embodiment, or the luma deblocking filter is de-activated on an edge between two RDPCM blocks according to another embodiment. De-activating a luma deblocking filter or a chroma deblocking filter is also referred to as de-activating deblocking filtering for a first color component, where the first color component is the luma component or one or more chroma components. De-activating a luma deblocking filter means de-activating the deblocking filtering operation on a luma edge between two luma blocks, whereas activating a luma deblocking filter means activating the deblocking filtering operation on a luma edge between two luma blocks. In some embodiments, the luma deblocking filter can be de-activated by setting the boundary strength value (b S) for the luma component to zero. Similarly, de-activating a chroma deblocking filter means de-activating the deblocking filtering operation on one or two chroma edges between two or four chroma blocks, and activating a chroma deblocking filter means activating the deblocking filtering operation on one or two chroma edges between two or four chroma blocks. In some embodiments, the chroma deblocking filter can be de-activated by setting the boundary strength value (bS) for the chroma components to zero. In the embodiments of applying the BDPCM or RDPCM mode to the luma component of a current block, the current block is regarded as an intra block in deblocking filter decisions for the chroma components. In other words, the deblocking filter for a second color component on the edge between the current block and another BDPCM/RDPCM coded block is activated if the BDPCM/RDPCM mode is only applied to a first color component of the current block. The second color component is one or more chroma components when the first component is a luma component, or the second color component is a luma component when the first color component is one or more chroma components. In the embodiment of only applying the BDPCM or RDPCM mode to the luma component, the deblocking filter decisions for the chroma components treat each BDPCM/RDPCM block as an intra predicted block, and therefore a deblocking filter operation might be applied to an edge between two intra predicted blocks. In one embodiment of only applying the BDPCM or RDPCM mode to the luma component of video data, for an edge between two BDPCM/RDPCM blocks, the boundary strength value (bS) for the luma component is set to zero whereas the boundary strength value (bS) for the chroma components, including Cb and Cr components, is set to two. In this embodiment, a deblocking filtering operation is used to filter the chroma components on the edge between two BDPCM/RDPCM blocks if further deblocking filtering criterions are satisfied. More generally, when the BDPCM or RDPCM mode is applied to a first color component, the boundary strength value of deblocking filter for the first color component on an edge between two BDPCM/RDPCM blocks is set to zero while the boundary strength value of deblocking filter for a second color component on the edge between two BDPCM/RDPCM blocks is set to two. The current block may be a Coding Unit (CU), a Prediction Unit (PU), or a Transform Unit (TU).

In some other embodiments, the BDPCM or RDPCM mode is only applied to chroma components of video data, a chroma deblocking filter is de-activated on an edge between two BDPCM coded blocks or two RDPCM coded blocks, however, a luma deblocking filter is activated on the edge between two BDPCM coded blocks or two RDPCM coded blocks. In an embodiment of only applying the BDPCM mode to chroma components, when the chroma components of a current block are processed by the BDPCM mode, deblocking filtering for the chroma components is de-activated on an edge between the current block and another BDPCM coded block adjacent to the current block, and deblocking filter for a luma component is activated on the edge between the current block and another BDPCM coded block. In an embodiment of only applying the RDPCM mode to chroma components, a deblocking filtering operation on an edge between two RDPCM blocks is performed by activating deblocking filtering for the chroma components on the edge and de-activating deblocking filtering for the luma component on the edge.

In the following embodiments, the BDPCM or RDPCM mode may be applied to one or both luma and chroma components, in one embodiment, both the luma deblocking filter and chroma deblocking filter are de-activated on an edge between two BDPCM or RDPCM coded blocks, in another embodiment, both the luma deblocking filter and chroma deblocking filter are activated on an edge between two BDPCM or RDPCM coded blocks. For example, the boundary strength values of deblocking filtering for both luma and chroma components are set to zero for an edge between two BDPCM blocks or two RDPCM blocks according to one embodiment and the boundary strength values of deblocking filtering for both luma and chroma components are set to two for an edge between two BDPCM blocks or two RDPCM blocks according to another embodiment.

In some embodiments of the present invention, the video encoding system explicitly signals a BDPCM prediction mode flag for a current block indicating the current block is coded in the BDPCM mode, and the video decoding system parses the BDPCM prediction mode flag for the current block. In one embodiment, the BDPCM mode is available for intra coding blocks, and a BDPCM prediction mode flag is signaled for each intra coding block indicating whether the intra coding block is coded in the normal intra prediction mode or BDPCM mode.

Figure 2:
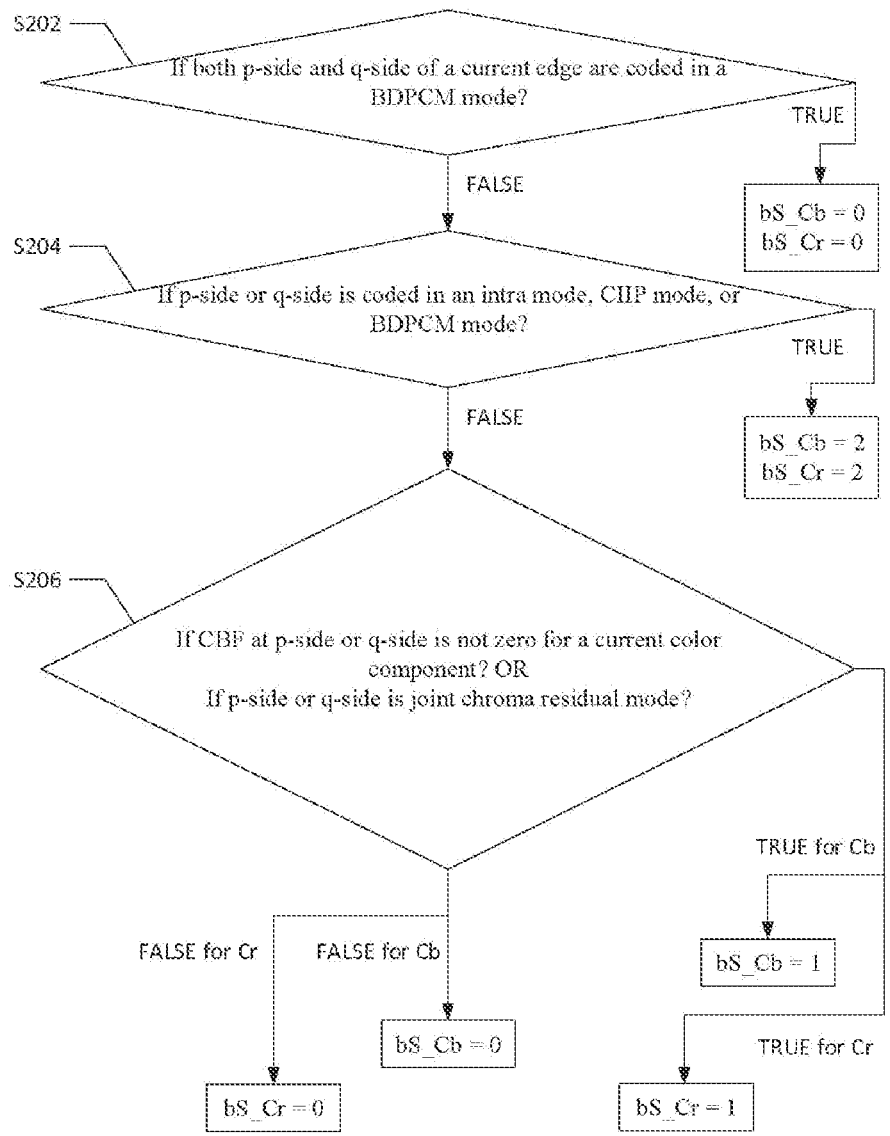
FIG. 2 illustrates determination of a boundary strength value of deblocking filtering for chroma components Cb and Cr on an edge between p-side and q-side according to an embodiment of the present invention.

Some examples of deriving a boundary strength value of deblocking filtering for a marked edge implementing an embodiment of the present invention are illustrated in FIG. 1 and FIG. 2. FIG. 1 illustrates a method of deriving a boundary strength value of deblocking filtering for a luma component Y according to an embodiment of the present invention. In FIG. 1, if the BDPCM mode is not applied to the luma component, each block coded in the chroma BDPCM mode is treated as a block coded in an intra mode for determining a boundary strength value for the luma component. In step S102, a video encoding or decoding system checks if both p-side and q-side of a current edge are coded in a luma BDPCM mode, and a boundary strength value of deblocking filtering for the luma component is set to zero ($bS\_Y=0$) for the current edge if both the p-side and q-side of the current edge are coded in the luma BDPCM mode. In cases when the checking result of step S102 is false, the encoding or decoding system checks if any of the p-side or q-side of the current edge is coded in the intra mode or Combined Inter and Intra Prediction (CIIP) mode, or if one of the p-side and q-side is coded in the luma BDPCM mode in step S104. The boundary strength value of deblocking filtering for the luma component is set to two ($bS\_Y=2$) for the current edge if the checking result of step S104 is true, otherwise the video encoding or decoding system checks if the current edge is a marked Transform Block (TB) edge and a Coded Block Flag (CBF) at the p-side or q-side is not zero for each color component in step S106. The boundary strength value of deblocking filtering for the luma component is set to one ($bS\_Y=1$) for the current edge if the checking result of step S106 is true. In cases when the checking result of step S106 is false, the video encoding or decoding system further checks if the current edge is a marked Prediction Block (PB) edge and reference pictures at the p-side and q-side are different or if the current edge is a marked PB edge and an absolute difference between mvx or mvy at the p-side and q-side is less than or equal to 8 in units of 1/16 luma samples in step S108, where mvx represents the horizontal dimension of the motion vectors and mvy represents the vertical dimension of the motion vectors. The boundary strength value of deblocking filtering for the luma component is set to one ($bS\_Y=1$) for the current edge if the checking result of step S108 is true and the boundary strength value is set to zero ($bs\_Y=0$) for the current edge if the checking result of step S108 is false.

FIG. 2 illustrates a method of deriving a boundary strength value of deblocking filtering for the chroma components Cb and Cr according to an embodiment of the present invention. In FIG. 2, if the BDPCM mode is not applied to the chroma components, each block coded in the luma BDPCM mode is treated as a block coded in an intra mode for determining a boundary strength value for the chroma component. In step S202, a video encoding or decoding system checks if both p-side and q-side of a current edge are coded in the chroma BDPCM mode. The boundary strength values of deblocking filtering for the chroma components are set to zero ($bs\_Cb=0$, $bs\_Cr=0$) if the checking result of step S202 is true, otherwise the video encoding or decoding system checks if any of the p-side or q-side of the current edge is coded in the intra mode or CIIP mode, or if one of the p-side or q-side of the current edge is coded in the chroma BDPCM mode in step S204. The boundary strength values of deblocking filtering for the chroma components are set to two (bS_Cb=2, bs_Cr=2) if the checking result of step S204 is true. In cases when the checking result of step S204 is false, the video encoding or decoding system further checks if the CBF at the p-side or q-side is not zero for a current chroma component or if the p-side or q-side is joint chroma residual mode in step S206. The boundary strength value of deblocking filter for the current chroma component Cb is set to one (bS_Cb=1) if the testing result of step S206 is true, else the boundary strength value for the current chroma component Cb is set to zero (bS_Cb=0). The boundary strength value of deblocking filter for the current chroma component Cr is set to one (bs_Cr=1) if the testing result of step S206 is true, else the boundary strength value for the current chroma component Cr is set to zero (bs_Cr=0).

Deblocking Filter Decision for an Edge Between Two BDPCM or RDPCM Blocks Considering Prediction Direction In some embodiments of the present invention, a signaled BDPCM direction for a BDPCM coded block is involved in making deblocking filter decisions for an edge of the BDPCM coded block. The signaled BDPCM direction is a prediction direction used in the BDPCM or RDPCM mode and signaled in or parsed from a video bitstream, for example, the prediction direction may be selected from a vertical direction and a horizontal direction. In an embodiment, deblocking filtering for both luma and chroma components is activated for filtering an edge between two BDPCM or RDPCM blocks if signaled BDPCM directions of these two blocks are different. In this embodiment, the BDPCM or RDPCM mode may be applied to the luma component, the chroma component, or both the luma and chroma components. For example, the BDPCM mode is only applied to the luma component of video data, and the boundary strength values of deblocking filtering on an edge between two BDPCM blocks for both the luma and chroma components are set to two when prediction directions of these two BDPCM blocks are different.

In another embodiment, deblocking filtering for both luma and chroma components is activated on an edge between two BDPCM or RDPCM blocks if the signaled BDPCM directions of these two BDPCM or RDPCM blocks are different, and deblocking filtering for at least one of the luma and chroma components is de-activated on an edge between two BDPCM or RDPCM blocks if the signaled BDPCM directions of these two BDPCM or RDPCM blocks are the same. In this embodiment, the BDPCM or RDPCM mode may be applied to the luma component, chroma components, or both the luma and chroma components. For example, when the BDPCM mode is only applied to the luma component of video data, the boundary strength values of deblocking filtering for both the luma and chroma components are set to two for an edge between two BDPCM blocks if prediction directions of the two BDPCM blocks are different; whereas the boundary strength value of deblocking filtering for the luma component is set to zero and the boundary strength value of deblocking filtering for the chroma components is set to two for an edge between two BDPCM blocks if prediction directions of the two BDPCM blocks are the same. In another example, when the BDPCM mode is applied to both the luma and chroma components of video data, the boundary strength values of deblocking filtering for both the luma and chroma components are set to two for an edge between two BDPCM blocks if prediction directions of the two BDPCM blocks are different; whereas the boundary strength values of deblocking filtering for both the luma and chroma components are set to zero for an edge between two BDPCM blocks if prediction directions of the two BDPCM blocks are the same. In yet another example, when the BDPCM mode is only applied to the chroma components of the video data, the boundary strength values of deblocking filtering for both the luma and chroma components are set to two for an edge between two BDPCM blocks if prediction directions of the two BDPCM blocks are different; whereas the boundary strength value of deblocking filtering for the luma component is set to two and the boundary strength value of deblocking filtering for the chroma components is set to zero for an edge between two BDPCM blocks if prediction directions of the two BDPCM blocks are the same.

Deblocking Filter Decision for an Edge with One Side Coded with BDPCM or RDPCM Some embodiments of the present invention treat each BDPCM or RDPCM coded block as an intra coded block when making deblocking filter decisions for any edge with one side coded with the BDPCM or RDPCM mode. For example, the boundary strength (bS) values of deblocking filtering for both the luma and chroma components are set to two when only one side of an edge is coded with the BDPCM or RDPCM mode, and therefore deblocking filters might be used for filtering the luma and chroma components.

In another embodiment, when the BDPCM or RDPCM mode is only applied to the luma component of video data, no luma deblocking is only applied to the side of a current edge coded with the BDPCM or RDPCM mode. That is for an edge with only one side coded with the BDPCM/RDPCM mode, deblocking filtering for the luma component is de-activated only at the side coded with the BDPCM/RDPCM mode, while deblocking filtering for the luma component is still activated at the other side of the edge. In still another embodiment, deblocking filtering for the luma component is de-activated on a current edge with any side of the current edge is coded with the BDPCM or RDPCM mode when the BDPCM or RDPCM mode is applied to the luma component. For example, the bS value of deblocking filtering for the luma component is set to zero if any side of an edge is coded with the BDPCM or RDPCM mode.

If the BDPCM or RDPCM mode is applied to the chroma components of video data, no chroma deblocking is only applied to the side of a current edge coded with the BDPCM or RDPCM mode according to one embodiment. For example, the bS value of chroma deblocking filtering for filtering the side coded with the BDPCM or RDPCM mode is set to zero while the bS value of chroma deblocking filtering for filtering the other side of the edge is set to two. In still another embodiment, deblocking filtering for the chroma components is de-activated on an edge with one side of the edge coded with the BDPCM or RDPCM mode. For example, the bS value of deblocking filtering for the chroma components is set to zero for a current edge if one side of the current edge is coded with the BDPCM or RDPCM mode.

The BDPCM or RDPCM coded block in the previously described embodiments may be a coding unit block, prediction unit block, or transform unit block.

Deblocking Filter Decision for Blocks Coded in Transform Skip Mode Some embodiments of the deblocking filter decisions are made depending on whether the block in one side or both sides of an edge is coded in transform Skip mode (TSM). A video encoder typically transforms, quantizes, and entropy encodes residual data of each block. The video encoder transforms the residual data by applying a transform operation, such as Discrete Cosine Transform (DCT), to the residual data in a pixel domain and transform into transform coefficients in a frequency domain. A video decoder performs the inverse of the operation that had been done in the video encoder, for example, the video decoder entropy decodes quantized transform coefficients, de-quantizes the transform coefficients, and performs an inverse transform operation to transform the transform coefficients back to residual data in the pixel domain. For a current block coded in TSM, the transform and inverse transform operations are skipped. Some examples of the current block include a Transform Unit (TU), Coding Unit (CU), or Prediction Unit (PU). The video encoder quantizes and entropy encodes pixel domain residual data associated with the current block; and the video decoder entropy decodes and de-quantizes the pixel domain residual data of the current block. A video encoder may generate a TSM flag for inclusion in the video bitstream indicating whether a current block is coded using TSM.

In cases when TSM is applied to the luma component, the luma deblocking filter is de-activated on an edge between two blocks coded in TSM according to an embodiment. For example, the bS value for the luma component is set to zero for an edge between two luma blocks both coded with TSM. In another embodiment, when only one of the two adjacent blocks is coded in TSM, the luma deblocking filter is not filtering the side of the edge coded with TSM, while the luma deblocking filter may be applied to the other side of the edge. In still another embodiment, the luma deblocking filter is de-activated on an edge if any side of the edge is coded with TSM. For example, the bS value for the luma component of a current edge is set to zero if any side of the current edge is coded with TSM.

In cases when TSM is applied to the chroma components, the chroma deblocking filter is de-activated on an edge between two blocks coded in TSM according to an embodiment. For example, the bS value for the chroma components is set to zero for an edge between two chroma blocks both coded in TSM. In another embodiment, when there is only one adjacent block coded in TSM, the chroma deblocking filter is not filtering the side of the edge coded with TSM, while the chroma deblocking filter may be applied to the other side of the edge. In still another embodiment, the chroma deblocking filter is de-activated on an edge if any side of the edge is coded with TSM. For example, the bS value for the chroma component of a current edge is set to zero if any side of the current edge is coded with TSM.

Deblocking Filter Decision Considering Motion Information for Blocks Coded in Transform Skip Mode In some other embodiments, the deblocking filter decisions also depend on motion information of two adjacent blocks when one or both of the adjacent blocks are coded in TSM. In cases when TSM is applied to the luma component, the luma deblocking filter is de-activated on an edge between two transform-skipped blocks if these two adjacent transform-skipped blocks have same or similar motion vectors and same reference pictures according to an embodiment. For example, the bS value for a current edge is set to zero if two adjacent luma blocks coded with TSM have same or similar motion vectors as well as same reference pictures. In another embodiment, the luma deblocking filter is de-activated on an edge between two luma blocks if at least one of the luma blocks is coded in TSM and both the luma blocks have same or similar motion vectors and same reference pictures. For example, the bS value for a current edge is set to zero if any side of the current edge is coded with TSM and both sides of the current edge have same or similar motion vectors and same reference pictures. The adjacent blocks of the edge may be CUs, PUs, or TUs. An example of similar motion vectors is defined by an absolute difference between horizontal and vertical components of the motion vectors is less than a threshold TH in a unit of quarter luma samples. For example, the threshold TH is 1, 2, 3, or 4. In another embodiment, the aforementioned examples or embodiments could also be applied to chroma components. For example, when TSM is applied to the chroma components, the chroma deblocking filter is de-activated on an edge between two transform-skipped blocks if these two adjacent transform-skipped blocks have same or similar motion vectors and same reference pictures according to an embodiment. For example, the bS value for a current edge is set to zero if two adjacent chroma blocks coded with TSM have same or similar motion vectors as well as same reference pictures. In another embodiment, the chroma deblocking filter is de-activated on an edge between two chroma blocks if at least one of the chroma blocks is coded in TSM and both the chroma blocks have same or similar motion vectors and same reference pictures.

Figure 3:
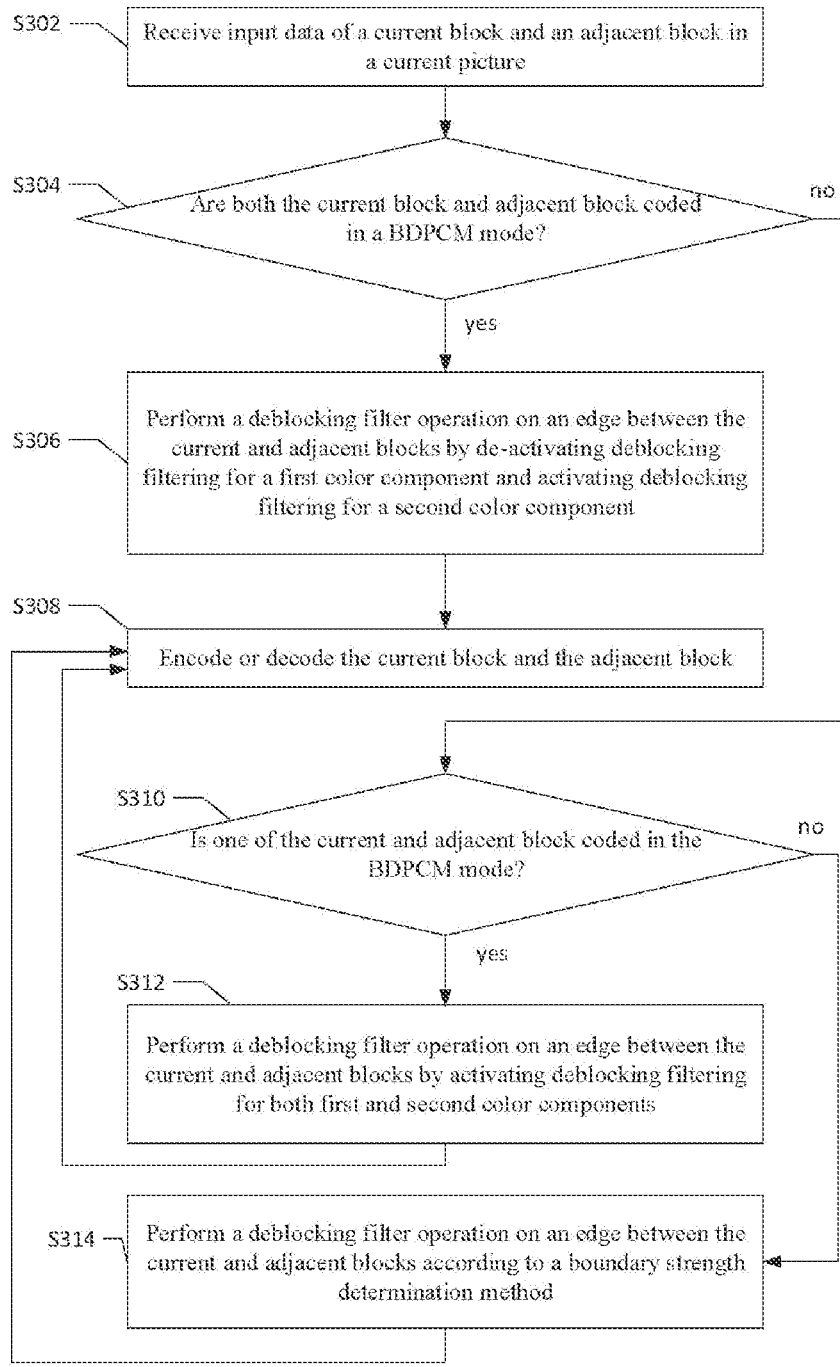
FIG. 3 is a flowchart illustrating an exemplary video processing method according to an embodiment of the present invention.

Exemplary Flowcharts of Encoding or Decoding Process FIG. 3 illustrates an exemplary flowchart of a video processing method to be implemented in a video encoding or decoding system according to an embodiment of the present invention. The video encoding or decoding system receives input data associated with a current block and an adjacent block in a current picture in step S302. At the encoder side, the input data corresponds to pixel data to be encoded into a video bitstream; at the decoder side, the input data corresponds to coded data or prediction residual to be decoded. The adjacent block is spatially adjacent to the current block. In step S304, the video encoding or decoding system determines if both the current block and the adjacent block are coded in a BDPCM mode. Each current pixel in a BDPCM coded block is predicted by one or more neighboring pixels of the current pixel in the current picture. If both the current block and the adjacent block are coded in the BDPCM mode, a deblocking filtering operation is performed on an edge between the current block and the adjacent block by de-activating deblocking filtering for a first color component on the edge and activating deblocking filtering for a second color component of the edge in step S306. For example, the first color component is a luma component (Y) and the second color component is one or more chroma components (Cb and Cr) when the BDPCM mode is only applied to the luma component. In another example, the first color component is one or more chroma components (Cb and Cr) and the second color component is a luma component (Y) when the BDPCM mode is only applied to the one or more chroma components. The video encoding or decoding system further checks if one of the current block and the adjacent block is coded in the BDPCM mode in step S310 when the checking result of step S304 is false. If one of the current block and the adjacent block is coded in the BDPCM mode, a deblocking filtering operation is performed on the edge between the current block and the adjacent block by activating deblocking filtering for both the first and second color components in step S312; otherwise a deblocking filtering operation is performed on the edge between the current block and the adjacent block according to a boundary strength determination method in step S314. An example of the boundary strength determination method is shown in Table 2. After the deblocking filtering operation in step S306, S312, or S314, the video encoding or decoding system encodes or decodes the current block and the adjacent block in the current picture in step S308.

Figure 4:
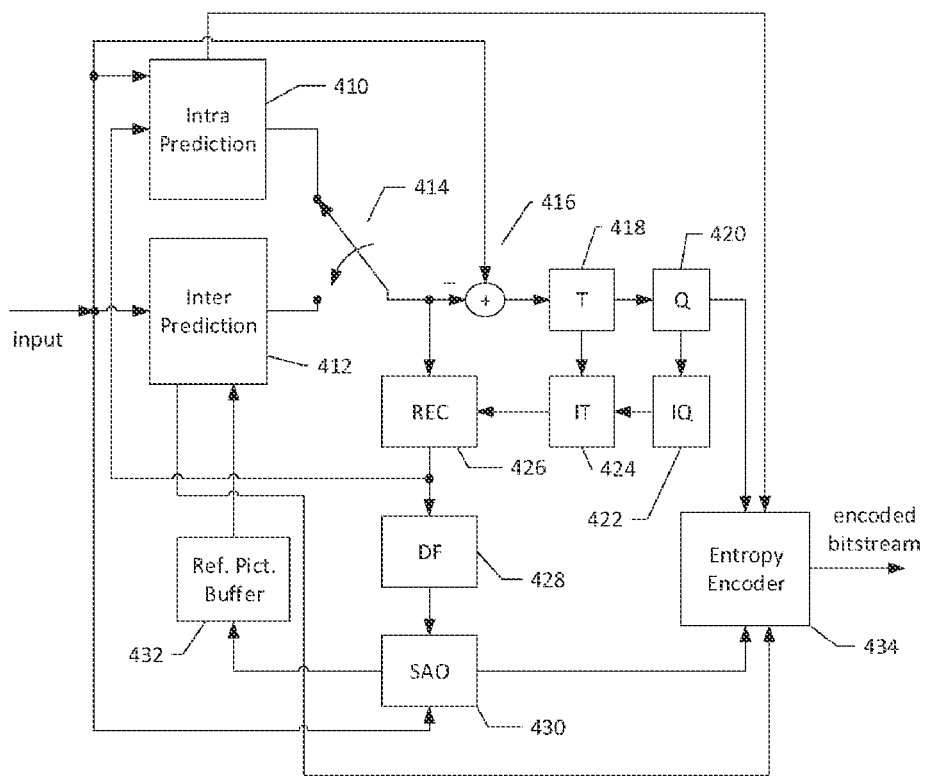
FIG. 4 illustrates an exemplary system block diagram for a video encoding system incorporating the video processing method according to embodiments of the present invention.

Video Encoder and Decoder Implementations The foregoing proposed video processing methods can be implemented in video encoders or decoders. For example, a proposed video processing method is implemented in a deblocking filter of an encoder, and/or a deblocking filter of a decoder. Alternatively, any of the proposed methods is implemented as a circuit coupled to the deblocking filter of the encoder and/or the deblocking filter of the decoder, so as to provide the information needed by the deblocking filter. FIG. 4 illustrates an exemplary system block diagram for a Video Encoder 400 implementing various embodiments of the present invention. Intra Prediction module 410 provides intra predictors based on reconstructed video data of a current picture. Inter Prediction module 412 performs motion estimation (ME) and motion compensation (MC) to provide inter predictors based on video data from other picture or pictures. For each block, either Intra Prediction module 410 or Inter Prediction module 412 supplies the selected predictor to Adder module 416 to form prediction errors, also called prediction residues. In some embodiments of the present invention, a current block is encoded by a BDPCM mode, and each current pixel in the current block is predicted by one or more neighboring pixels of the current pixel in the current picture. A predictor for each current pixel in the current block coded in the BDPCM mode is determined from the neighboring pixels of the current pixel, and a residue for each current pixel is determined according to the predictor of each current pixel. The prediction residue of each block is normally further processed by Transform module (T) 418 followed by Quantization module (Q) 420. In some embodiments of the BDPCM mode, the prediction residues of BDPCM coded blocks is quantized in a spatial domain instead of transforming into a frequency domain, in this case, the residue of each current pixel in the current block is processed by Quantization module 420 to generate a quantized residue. The quantized residue is then encoded by Entropy Encoder 432 to form a video bitstream. The video bitstream is then packed with side information. The quantized residue of each current pixel in the current block is then processed by Inverse Quantization module (IQ) 422 to de-quantize the quantized residue. Since the transform operation is skipped for the residues of the current block, the de-quantized residues of the current block are not processed by Inverse Transform module (IT) 424. As shown in FIG. 4, each current pixel is reconstructed by adding the de-quantized residue back to the predictor of each current pixel at Reconstruction module (REC) 426 to produce reconstructed video data. Each reconstructed current pixel of the current block is then used to predict a next pixel in the current block according to a raster scan order according to an embodiment. The reconstructed video data may be stored in Reference Picture Buffer (Ref. Pict. Buffer) 432 and used for prediction of other pictures. The reconstructed video data recovered from REC 426 may be subject to various impairments due to encoding processing; consequently, In-loop processing Deblocking Filter (DF) 428 and Sample Adaptive Offset (SAO) 430 are applied to the reconstructed video data before storing in the Reference Picture Buffer 432 to further enhance picture quality. Embodiments of DF 428 de-activates deblocking filtering for a first color component and activates deblocking filtering for a second color component when performing a deblocking filtering operation on an edge between the current block and an adjacent block coded in the BDPCM mode. For example, the first color component is a luma component and the second color component is chroma components when the BDPCM mode is only applied to the luma component. Syntax associated with information for the in-loop processing DF 428 and SAO 430 are provided to Entropy Encoder 434 for incorporation into the encoded video bitstream.

In some other embodiments, the current block is encoded in the RDPCM mode, and each current pixel in the current block is predicted by inter or intra prediction in Inter Prediction module 412 or Intra Prediction module 410 to generate a predictor of each current pixel. A residue for each current pixel in the current block is determined according to the predictor of each current pixel by Adder 416, and the residue is quantized by Quantization module 420 in a spatial domain. The RDPCM is then applied to the quantized residues of the current block to process the quantized residues according to a prediction direction. An example of the prediction direction is selected from horizontal and vertical directions and is signaled in the video bitstream. The processed quantized residues are de-quantized in Inverse Quantization module 422 and each current pixel in the current block is reconstructed in Reconstruction module 426 by adding the corresponding de-quantized residue and the predictor of the current pixel. In Deblocking Filter 428, a boundary strength determination method checks if both sides of an edge are coded in the RDPCM mode, and performs a deblocking filtering operation on the edge of two RDPCM blocks by de-activating deblocking filtering for a first color component and activating deblocking filtering for a second color component. For example, the first color component is a luma component and the second color component is one or more chroma components if RDPCM is applied to the luma component. In another example, the first color component is one or more chroma components and the second color component is a luma component if RDPCM is applied to the one or more chroma components.

Figure 5:
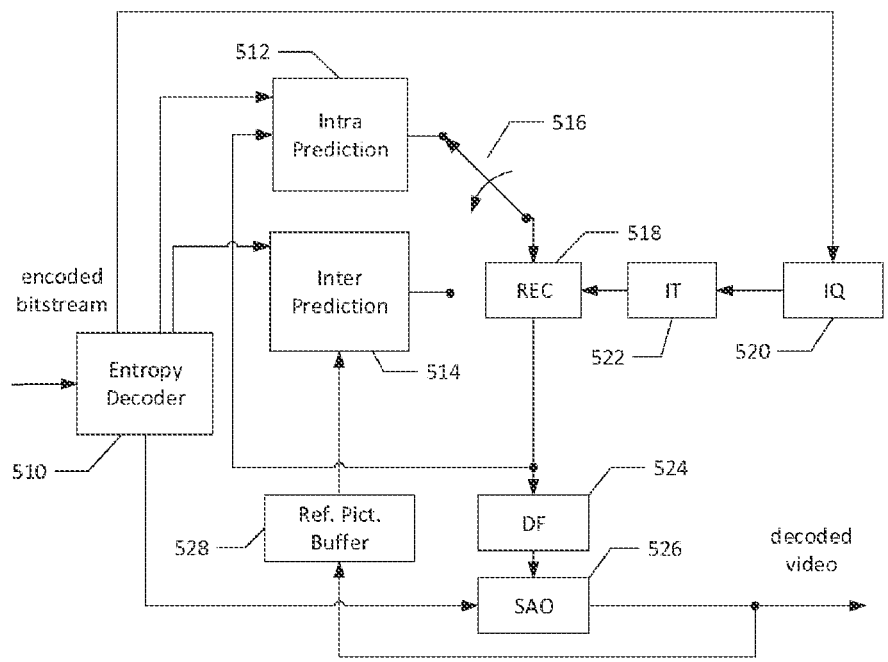
FIG. 5 illustrates an exemplary system block diagram for a video decoding system incorporating the video processing method according to embodiments of the present invention.

A corresponding Video Decoder 500 for decoding the video bitstream generated from the Video Encoder 400 of FIG. 4 is shown in FIG. 5. The video bitstream is the input to Video Decoder 500 and is decoded by Entropy Decoder 510 to parse and recover the quantized residues and other system information. The decoding process of Decoder 500 is similar to the reconstruction loop at Encoder 400, except Decoder 500 only requires motion compensation prediction in Inter Prediction module 514. Each block is decoded by either Intra Prediction module 512 or Inter Prediction module 514. A current block in some embodiments of the present invention is decoded by the BDPCM mode according to a prediction direction. An example of the prediction direction is selected from horizontal and vertical directions and is parsed from the video bitstream. Switch module 516 selects an intra predictor from Intra Prediction module 512 or an inter predictor from Inter Prediction module 514 according to decoded mode information. The quantized residue associated with each current pixel of the current block coded in the BDPCM mode is de-quantized by Inverse Quantization module (IQ) 520 to generate de-quantized residues. The inverse transform operation performed in Inverse Transform module (IT) 522 is skipped when processing a BDPCM or RDPCM coded block according to some embodiments. Each current pixel is reconstructed by adding back the de-quantized residue for each current pixel with the predictor of each current pixel in REC 518 to produce reconstructed video data. Each reconstructed current pixel in the current block is used to predict a next pixel in the current block according to a raster scan order. The reconstructed video data is further processed by DF 524 and SAO 526 to generate final decoded video. In DF 524, a deblocking filtering operation is performed on an edge between the current block and an adjacent block, where both the current block and the adjacent block are coded in the BDPCM mode. The deblocking filtering operation performed on the edge between two BDPCM blocks de-activates deblocking filtering for a first color component and activates deblocking filtering for a second color component according to some embodiments of the present invention. For example, the first color component is a luma component and the second color component is one or more chroma components when BDPCM is only applied to the luma component. If the currently decoded picture is a reference picture, the reconstructed video of the currently decoded picture is also stored in Ref. Pict. Buffer 528 for later pictures in decoding order.

In some embodiments, the current block is coded in the RDPCM mode, Inter Prediction module 514 or Intra Prediction module 512 is used to predict a predictor of each current pixel in the current block, and quantized residues of the current block is decoded from the video bitstream. RDPCM is applied to process the quantized residues of the current block, and the processed quantized residues are de-quantized in Inverse Quantization module 520. Each current pixel in the current block is reconstructed in REC 518 by adding the corresponding de-quantized residue and the predictor of the current pixel. DF 524 performs a deblocking filtering operation on an edge between the current block and an adjacent block, where the adjacent block is also coded in the RDPCM mode. The deblocking filtering operation performed on the edge between two RDPCM blocks de-activates deblocking filtering for a first color component while activates deblocking filtering for a second color components. For example, the first color component is a luma component and the second color component is one or more chroma components when RDPCM is only applied to the luma component.

Various components of Video Encoder 400 and Video Decoder 500 in FIG. 4 and FIG. 5 may be implemented by hardware components, one or more processors configured to execute program instructions stored in a memory, or a combination of hardware and processor. For example, a processor executes program instructions is used to control performing a deblocking filtering operation on edges between blocks. The processor is equipped with a single or multiple processing cores. In some examples, the processor executes program instructions to perform functions in some components in Encoder 400 and Decoder 500, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 4 and 5, Encoder 400 and Decoder 500 may be implemented in the same electronic device, so various functional components of Encoder 400 and Decoder 500 may be shared or reused if implemented in the same electronic device. For example, one or more of Reconstruction module 426, Inverse Transform module 424, Inverse Quantization module 422, Deblocking Filter 428, Sample Adaptive Offset 430, and Reference Picture Buffer 432 in FIG. 4 may also be used to function as Reconstruction module 518, Inverse Transform module 522, Inverse Quantization module 520, Deblocking Filter 524, Sample Adaptive Offset 526, and Reference Picture Buffer 528 in FIG. 5, respectively.

Embodiments of the video processing method for encoding or decoding may be implemented in a circuit integrated into a video compression chip or program codes integrated into video compression software to perform the processing described above. For examples, performing a deblocking filtering operation may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video coding system, comprising:
    receiving input data associated with a current block and an adjacent block in a current picture, wherein the adjacent block is spatially adjacent to the current block;
    determining if the current block and the adjacent block are both coded in a Block Differential Pulse Code Modulation (BDPCM) mode, wherein each current pixel in each BDPCM coded block in the current picture is predicted by one or more neighboring pixels of the current pixel in the current picture;
    performing a deblocking filtering operation on an edge between the current block and the adjacent block by de-activating deblocking filtering for a first color component on the edge between the current block and the adjacent block and activating deblocking filtering for a second color component on the edge between the current block and the adjacent block when the current block and the adjacent block are both coded in a BDPCM mode; and
    encoding or decoding the current block and the adjacent block in the current picture.

2. The method of claim 1, wherein the BDPCM mode is only applied to a luminance (luma) component of the current block and the adjacent block, and the first color component is the luma component and the second color component is one or more chrominance (chroma) components.

3. The method of claim 1, wherein the BDPCM mode is only applied to one or more chrominance (chroma) components of the current block and the adjacent block, and the first color component is the one or more chroma components and the second color component is a luminance (luma) component.

4. The method of claim 1, wherein a boundary strength value of deblocking filtering for the second color component on the edge between the current block and the adjacent block is set to two.

5. The method of claim 4, wherein a boundary strength value of deblocking filtering for the first color component on the edge between the current block and the adjacent block is set to zero.

6. The method of claim 1, further comprising receiving input data associated with a second adjacent block adjacent to the current block, determining that the second adjacent block coded in a mode other than the BDPCM mode, and performing a deblocking filtering operation on an edge between the current block and the second adjacent block by activating deblocking filtering for both the first and second color components on the edge between the current block and the second adjacent block.

7. The method of claim 1, wherein the deblocking filtering operation on an edge between the current block and the adjacent block is performed based on the determination result.

8. A method of processing video data in a video coding system, comprising:
receiving input data associated with a current block and an adjacent block in a current picture, wherein the adjacent block is spatially adjacent to the current block;
determining if the current block and the adjacent block are both coded in a Residual Differential Pulse Code Modulation (RDPCM) mode, wherein RDPCM is applied to quantized residues of the current block according to a prediction direction of the current block, and RDPCM is applied to quantized residues of the adjacent block according to a prediction direction of the adjacent block;
performing a deblocking filtering operation on an edge between the current block and the adjacent block by de-activating deblocking filtering for a first color component on the edge between the current block and the adjacent block and activating deblocking filtering for a second color component on the edge between the current block and the adjacent block when the current block and the adjacent block are coded in a RDPCM mode; and
encoding or decoding the current block and the adjacent block in the current picture.

9. The method of claim 8, wherein the RDPCM mode is only applied to a luminance (luma) component of the current block and the adjacent block, and the first color component is the luma component and the second color component is one or more chrominance (chroma) components.

10. The method of claim 8, wherein the RDPCM mode is only applied to one or more chrominance (chroma) components of the current block and the adjacent block, and the first color component is the one or more chroma components and the second color component is a luminance (luma) component.

11. The method of claim 8, wherein a boundary strength value of deblocking filtering for the second color component on the edge between the current block and the adjacent block is set to two.

12. The method of claim 11, wherein a boundary strength value of deblocking filtering for the first color component on the edge between the current block and the adjacent block is set to zero.

13. The method of claim 8, further comprising determining a prediction direction of the current block and a prediction direction of the adjacent block, wherein the deblocking filtering operation is performed by activating deblocking filtering for both the first and second color components on the edge between the current block and the adjacent block if the prediction directions of the current block and the adjacent block are different.

14. The method of claim 8, wherein the deblocking filtering operation on an edge between the current block and the adjacent block is performed based on the determination result.

15. An apparatus of processing video data in a video coding system, the apparatus comprising one or more electronic circuits configured for:
receiving input data associated with a current block and an adjacent block in a current picture, wherein the adjacent block is spatially adjacent to the current block;
determining the current block and the adjacent block are both coded in a Block Differential Pulse Code Modulation (BDPCM) mode or are both coded in a Residual Differential Pulse Code Modulation (RDPCM) mode, wherein each current pixel in each BDPCM coded block in the current picture is predicted by one or more neighboring pixels of the current pixel in the current picture, and RDPCM is applied to quantized residues of each RDPCM coded block according to a prediction direction of the RDPCM coded block;
performing a deblocking filtering operation on an edge between the current block and the adjacent block by de-activating deblocking filtering for a first color component on the edge between the current block and the adjacent block and activating deblocking filtering for a second color component on the edge between the current block and the adjacent block; and
encoding or decoding the current block and the adjacent block in the current picture.

* * * * *